US009396314B2

(12) United States Patent
Cossard et al.

(10) Patent No.: US 9,396,314 B2
(45) Date of Patent: Jul. 19, 2016

(54) METHOD FOR REMOTELY LOCKING/UNLOCKING A MACHINE (75) Inventors: David Cossard, Vauréal (FR); Gérard Dedieu, Montigny le Bretonneux (FR)

(73) Assignee: EVIDIAN, Les Clayes sous Bois (FR)

( * ) Notice: Subject to any disclaimer, the term of this patent is extended or adjusted under 35 U.S.C. 154(b) by 47 days.

(21) Appl. No.: 13/579,074

(22) PCT Filed: Feb. 4, 2011

(86) PCT No.: PCT/FR2011/050231
§ 371 (c)(1),
(2), (4) Date: Oct. 17, 2012

(87) PCT Pub. No.: WO2011/101574
PCT Pub. Date: Aug. 25, 2011

(65) Prior Publication Data
US 2013/0031614 A1  Jan. 31, 2013

(30) Foreign Application Priority Data
Feb. 17, 2010 (FR) ...................................... 10 51146

(51) Int. Cl.
*G06F 15/16* (2006.01)
*G06F 21/31* (2013.01)
(52) U.S. Cl.
CPC ....................................... *G06F 21/31* (2013.01)
(58) Field of Classification Search
CPC ..................................................... G06F 21/31
See application file for complete search history.

(56) References Cited

U.S. PATENT DOCUMENTS

| 7,464,272 | B2* | 12/2008 | Danieli ........................ 713/182 |
| 7,941,533 | B2* | 5/2011 | Miller et al. .................. 709/225 |
| 2004/0103323 | A1* | 5/2004 | Dominic ....................... 713/202 |
| 2005/0066012 | A1* | 3/2005 | Campbell ............. G06Q 30/04 709/217 |
| 2005/0193118 | A1* | 9/2005 | Le .......................... G06F 21/31 709/227 |
| 2009/0006402 | A1* | 1/2009 | Bohle et al. ...................... 707/8 |

OTHER PUBLICATIONS

"Ubuntu Manuals"; Internet citation, Jun. 1, 2006; XP007913447; URL://http://manpages.ubuntu.com/manpages/dapper/man1/xscreensaver-command.1.html.
"Sudoers Manual", internet citation, Oct. 15, 2004; XP007913462; URL://http:web.archive.org/web/20041015183133/http:www.gratisoft.us/sudo/man/sudoers.htm; p. 2 and 14-15.
(Continued)

*Primary Examiner* — David Garcia Cervetti
*Assistant Examiner* — Khoi Le
(74) *Attorney, Agent, or Firm* — Pillsbury Winthrop Shaw Pittman LLP (57) ABSTRACT A method for changing the status, locked or unlocked, of a target machine including a security service and a session management module includes receiving, by the security service, a query corresponding to a request to change the status of the target machine, the query including at least one piece of identification information from a user of a source machine; from the security service, verifying if access rights to the target machine related to the user of the source machine allow a change in the status of the target machine by the user; if so, sending, from the security service, a status change message to the session management module of the target machine and proceeding to the status change made by the session management module.

13 Claims, 6 Drawing Sheets

(56) References Cited

OTHER PUBLICATIONS

Ubuntu QA Team; "Howto: Replace gnome-screensaver with xscreensaver"; Ubuntu project; Jun. 13, 2006, XP002587361; URL:http://ubuntuforums.org/showthread.php?t=195557.

Zawinski; "Manpage of xscreensaver"; X 11 project, Mar. 20, 2005, XP002587293; URL:http://gd.tuwien.ac.at/linuxommand,org/man_pages/xscreensaver1.html.

Ubuntu QA Team, "Kill screensaver from terminal", Ubuntu Project, Mar. 8, 2007, XP002587362; URL:http://ubuntuforums.org/showthread.php?t=379103.

* cited by examiner

METHOD FOR REMOTELY LOCKING/UNLOCKING A MACHINE

CROSS REFERENCE TO RELATED APPLICATIONS

This application is the U.S. National Stage of PCT/FR2011/050231, filed Feb. 4, 2011, which in turn claims priority to French Patent Application No. 1051146, filed Feb. 17, 2010, the entire contents of all applications are incorporated herein by reference in their entireties.

TECHNICAL FIELD OF THE INVENTION

The present invention relates to a method for changing the status, locked or unlocked, of a target machine. The invention also relates to a target machine capable of implementing the status change method.

The invention finds a particular, but non-limiting, application in the banking field.

TECHNOLOGICAL BACKGROUND OF THE INVENTION

A method to change the status, locked or unlocked, of a target machine, known to the person skilled in the art, enables said machine to be locked, either by an action of the machine user, or automatically when no action via the keyboard or mouse is performed on said machine after a given time.

Therefore, in the banking field, when a trader is absent from his workstation, either he locks his target machine himself, or the target machine on which he works is locked automatically after a given time, particularly when the trader is absent from his workstation. Locking therefore prevents any other person from illicitly using this target machine in the absence of its user.

The trader launches share operations by means of the target machine. These share operations are scripts that may sometimes last several hours.

These share operations depend on very sensitive data that rapidly change over time such as a share value or economic or political data. This is why it is necessary to keep sight of the changes that occur throughout the day in the share operations that have been launched. When the trader is absent from his workstation, the data on the target machine screen remain visible, as does as the sequence of share operations that have been launched.

One disadvantage of this prior art is that when a trader is absent from his workstation, depending on the fluctuation of sensitive data mentioned above, it is sometimes necessary to stop or quickly modify the share operations that have been launched. As the target machine has been locked to prevent any other person from fraudulently using this target machine, no intervention on the target machine is possible by a user of another machine to perform these actions on the share operations.

GENERAL DESCRIPTION OF THE INVENTION

The object of the present invention is a method to change the status, locked or unlocked, of a target machine that resolves the problems that may occur on said target machine in the absence of its user and when said machine was previously locked, in particular.

This object is reached by a method to change the status, locked or unlocked, of a target machine comprising a security service and a session management module, the method comprising the steps of:

receiving, by said security service, a query corresponding to a request to change the status of the target machine, said request comprising at least one piece of identification information from a user of a source machine;
from said security service, verifying if access rights to said target machine associated with said user of the source machine allow a change in the status of the target machine by said user;
if so, sending, from said security service, a status change message to the session management module of said target machine and proceeding to said status change by said session management module.

As will be seen subsequently in detail, thanks to the authorization to change the status of the target machine that is given to a user of a source machine (different from the target machine) via the associated access rights, the latter will be able to remotely unlock the target machine (therefore the machine of another person) that is locked, i.e., he will be able to unlock a user session that he did not himself open. Conversely, he will be able to lock remotely the target machine if it is in an unlocked status.

According to non-limiting modes of embodiment, the method may also comprise one or more additional characteristics from among the following:
the method comprises an additional step of recording, in a query management base, traceability information corresponding to said query.
This enables an audit to be done on said queries and in particular enables verification of the real person who is at the origin of an action on the target machine.
access rights depend on the delegation parameters from one group of users to another group of users.
This enables the access rights delegation authorizations to be managed by an administrator of a bank of machines comprising the target machine and the source machine.
the delegation parameters can be activated by a user from a group of users.
This enables a delegation of access rights to be initiated at the user level. The user is then master of the authorizations that he gives to users of other machines to access his machine within the limits of the delegations authorized by the machine bank administrator.
the execution parameters are associated with the access rights. The access rights are therefore parameterable.
the query to change the status is a TCP/IP or UDP query. This enables communication between two machines from a same computer network.
a status change message is an application-oriented message defined according to the session management module of the target machine.
This enables existing standard messages to be used.
the status change message is sent to a plug-in of the session management module.
This prevents modification of the session management user interface that is comprised in the session management module of the target machine.

The invention also relates to a target machine comprising a security service and a session management module, said target machine being capable of:
receiving, by said security service, a query corresponding to a request to change the status, said query comprising at least one piece of identification information from a user of a source machine;
from said security service, verifying if access rights associated with said source machine user allow a change in its status by said user;

if so, sending, from said security service, a status change message to the session management module and proceeding to said status change by said session management module.

According to a non-limiting mode of embodiment, the session management module comprises:
- a plugin capable of receiving a status change message from said security service; and
- a session management user interface capable of being solicited by said plugin to change the status of said target machine.

The invention also relates to a source machine capable of cooperating with a target machine according to one of the previous characteristics, said target machine comprising a security service, said source machine being capable of:
- receiving a request to change the status of the target machine from a source machine user; and
- sending a query corresponding to said request to the security service of said target machine, said query comprising at least one piece of identification information from a user of said source machine.

The invention also relates to a computer system capable of performing a change of status, locked or unlocked, of a target machine, said computer system comprising a target machine according to any one of the previous characteristics, and a source machine according to the previous characteristic capable of cooperating with said target machine.

The invention and its various applications will be better understood upon reading the following description and examining the accompanying figures.

BRIEF DESCRIPTION OF THE FIGURES

The figures are presented for indicative purposes and in no way limit the invention.

DESCRIPTION OF MODES OF EMBODIMENT OF THE INVENTION

Figure 1:
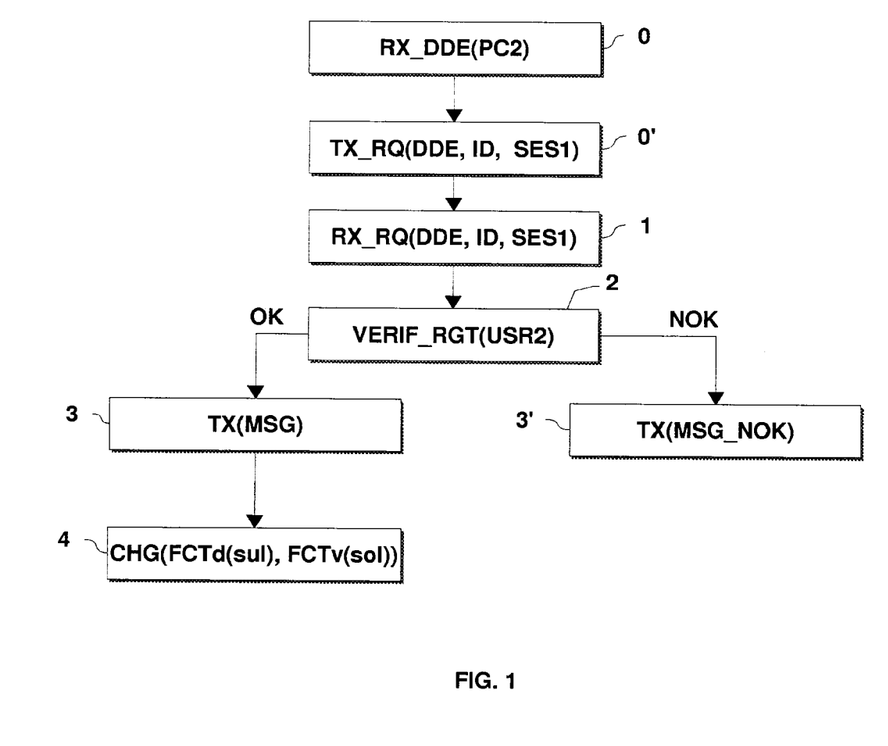
FIG. 1 particularly illustrates a first simplified flowchart of a non-limiting embodiment of the status change method according to the invention.
Figure 2:
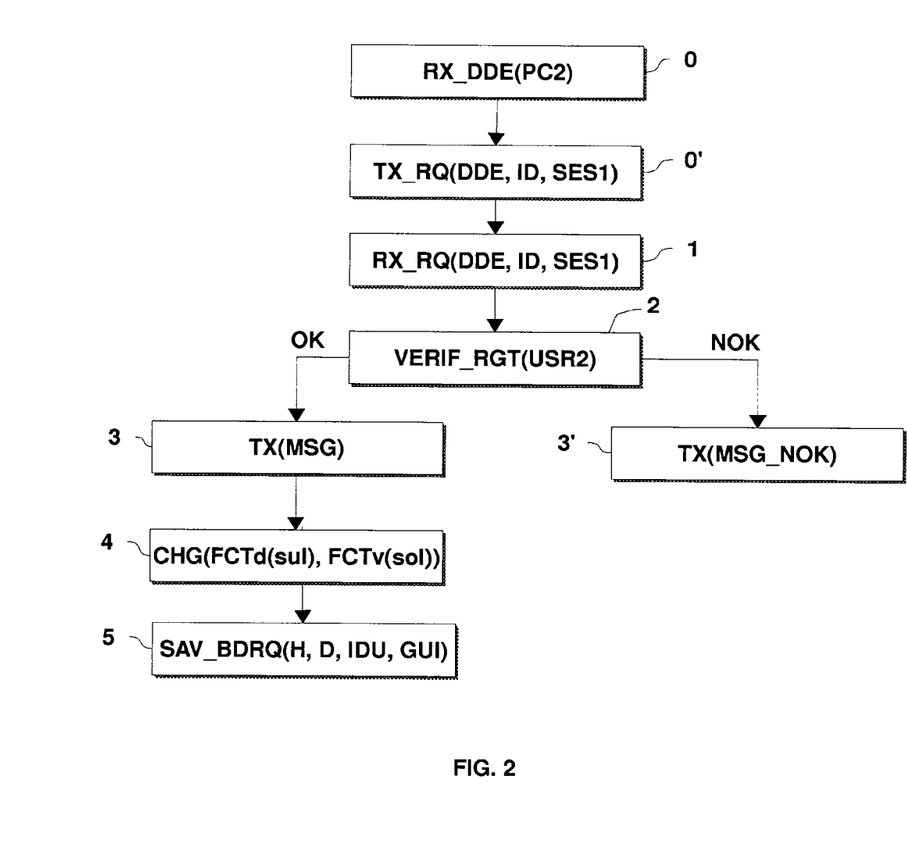
FIG. 2 particularly illustrates a second simplified flowchart of the status change method from FIG. 1, said method also comprising an additional step of recording query traceability information.

The method to change the status, locked or unlocked, of a target machine comprising a security service and a session management module is described in a non-limiting embodiment in FIG. 1 and FIG. 2.

Change of status, locked slo or unlocked sul, of a machine is understood to refer to the act of unlocking a user session that is locked or locking a user session that is unlocked.

Figure 3:
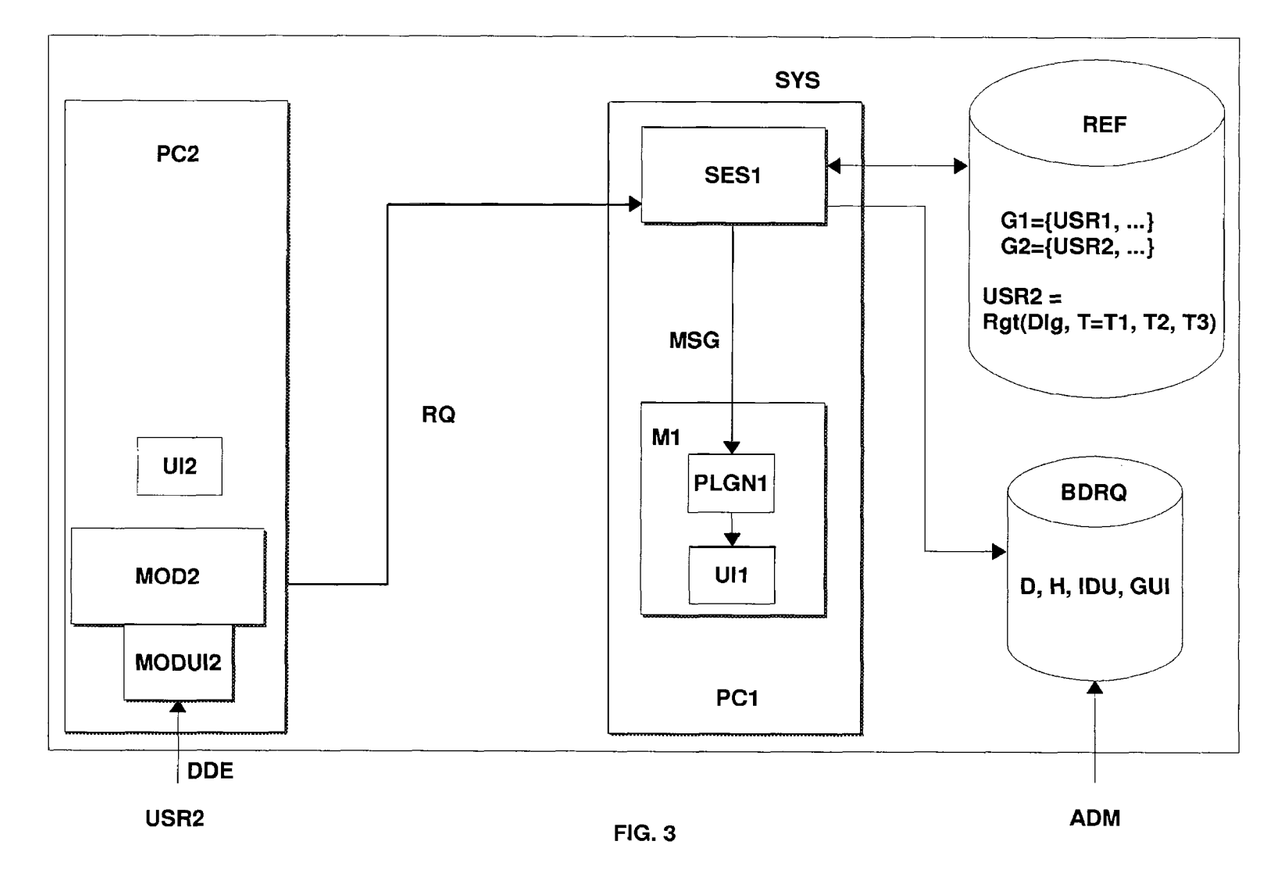
FIG. 3 is a first schematic representation of a computer system comprising a target machine and a source machine, according to a first non-limiting embodiment, said target machine being capable of implementing the status change method from FIGS. 1 and 2.

The status change method is implemented by the target machine in a computer system SYS comprising said target machine PC1 and a source machine PC2 as illustrated in FIG. 3. Machine is understood to refer to any computer equipment comprising a user interface by which a user may be authenticated with his identifier and his password. In the non-limiting examples, a machine may be an individual workstation or a server.

When a first user USR1 of the target machine PC1 accesses said machine, he is connected under a user session specific to him via an identifier that is specific to him and an associated password. The connection (also called session opening) is done via a session management user interface UI1 that is a component of the user interface (not represented) of the machine. The identifier and the password form what is commonly called a "login." A user session may be locked manually by the first user or automatically after a given time, such that no one may access target machine PC1.

In the rest of the description, the term user session and the term session will be used indifferently.

When a second user USR2 of the source machine PC2 wishes to remotely change the status, locked or unlocked, of the target machine PC1 (to access it), he initiates a request DDE to change the status of the target machine PC1 from the source machine PC2. He does this by means of a user interface MODUI2 associated with a locking/unlocking module MOD2 of the source machine PC2, such as illustrated in FIG. 3.

In a non-limiting example, the user interface MODUI2 is composed of an icon in a taskbar on the screen of the PC2 machine and proposes:
- a list of users (including the first user USR1) that have activated the access rights to their machine(s) associated with the second user URS2,
- then, after the second user USR2 has chosen the first user URS1, a list of machine(s) of the second user USR2 on which the second user USR2 effectively has access rights.

Figure 4:
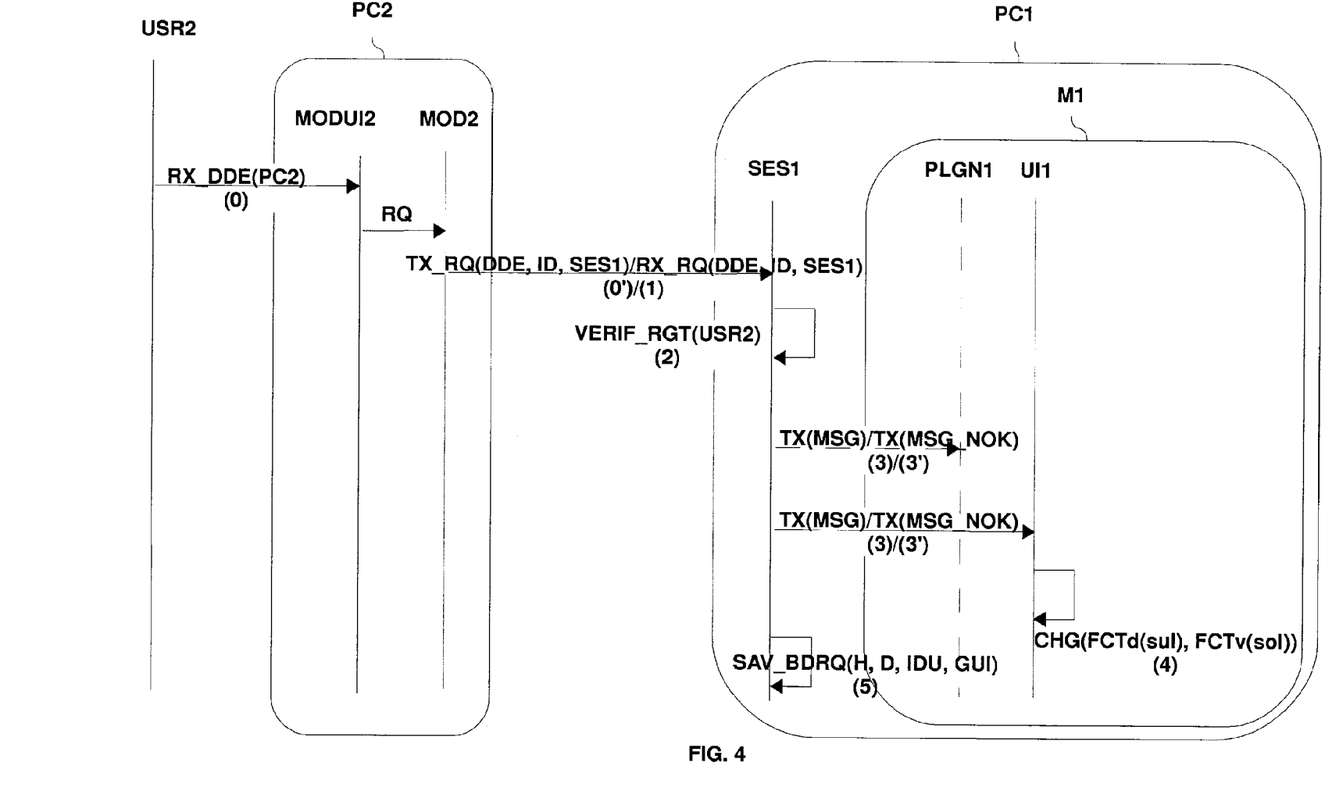
FIG. 4 schematically illustrates exchanges of queries and messages between a target machine and a source machine according to a non-limiting embodiment of the method from FIG. 2.

Therefore, the source machine PC2 receives the request DDE to change the status of the target machine PC1 from user USR2 of source machine PC2, such as illustrated in FIG. 2 ((step RX_DDE(PC2) referenced previous step 0) in FIGS. 1, 2 and 4).

In a non-limiting mode of embodiment, upon activation of user interface MODUI2, the request DDE to change the status of the target machine PC1 is sent to the locking/unlocking module MOD2 of the source machine PC2.

Then, said source machine PC2 sends, to said security service SES1 of said target machine PC1, a query RQ corresponding to said request DDE, said query RQ comprising at least one piece of identification information ID from the user USR2 of the source machine PC2 (step TX_RQ(DDE, ID, SES1) (referenced previous step 0') in FIGS. 1, 2 and 4).

In a non-limiting embodiment, the locking/unlocking module MOD2 of source machine PC2 sends said query RQ.

In non-limiting embodiments, the status change query RQ is a TCP/IP (Transmission Control Protocol/Internet Protocol) or UDP (User Datagram Protocol) query. In the latter case, the queries are called datagrams. The communication protocol UDP is a simple protocol that enables queries to be sent to another machine without a previous communication request. Of course, other communication protocols enabling a query to be sent between two machines may be used.

At this time, the status change method is implemented. Said method comprises the following steps as illustrated in FIG. 1 and FIG. 2:

receiving by said security service SES1 a query RQ corresponding to a request DDE to change the status of the target machine PC1, said query RQ comprising at least one piece of identification information ID from a user USR2 of a source machine PC2 (step RX_RQ(DDE, ID, SES1));

from said security service SES1, verifying if access rights Rgt to said target machine PC1 associated with said user USR2 of the source machine PC2 allow a change in the status of the target machine PC1 by said user USR2 (step VERIF_RGT(USR2));

if so, sending, from said security service SES1, a status change message MSG to the session management module M1 of said target machine PC1 (step TX(MSG)) and proceeding to said status change slo/sul by said session management module M1 (step CHG(FCTd(sul), FCTv(sol))).

In a non-limiting embodiment, if not, the status change method comprises an additional step of sending from said security service SES1 an error message MSG_NOK to alert the second user USR2 that he does not have the rights to lock/unlock the target machine PC1 (step TX(MSG_NOK)).

According to a non-limiting embodiment, the method also comprises an additional step of recording, in a query management base BDRQ, traceability information H, D, IDU, GUI corresponding to said query RQ (step SAV_BDRQ(H, D, IDU, GUI) illustrated in FIG. 2).

For the rest of the description, in the non-limiting embodiment of the method described, the method comprises these additional steps.

Thus, the steps of the status change method are described in detail below by referring to FIGS. 2, 3 and 4.

In the following example, the target machine PC1 is in a locked status slo.

It is noted that when a machine is locked, the user session is locked. This means that no user action is possible, apart from via the keyboard of the target machine PC1 by which the only possible action is the reactivation of the user session by entering the user identifier and the password associated with the first user USR1.

It will be noted that the source machine PC2 comprises a locking/unlocking module MOD2, an associated user interface MODUI2 and a session management user interface UI2, and the target machine PC1 comprises a session management user interface UI1, this latter being situated in a session management module M1, as illustrated in FIG. 3.

In a first step 1), said security service SES1 receives a query RQ corresponding to a request DDE to change the status of the target machine PC1, said query RQ comprising at least one piece of identification information ID from a user USR2 of a source machine PC2.

This identification information ID enables identification of the author of the query RQ, here the second user USR2, and consequently the access rights associated with said user USR2 used in the following step. In a non-limiting example, this identification information ID is a unique identifier associated with the user (commonly called "Global Unique Identifier").

In a second step 2), the security service SES1 verifies if access rights Rgt to said target machine PC1 associated with said user USR2 of the source machine PC2 allow a change in the status of the target machine PC1 by said user USR2.

In a non-limiting embodiment, access rights Rgt depend on the delegation parameters Dlg from one group of users G1 to another group of users G2.

It will be noted that these parameters are defined by an administrator ADM managing a bank of machines in which the target machine PC1 and the source machine PC2 are found.

Therefore, in a non-limiting example, a delegation parameter Dlg may stipulate that a first group of users G1, called the delegator group, (said group including the first user USR1) has the right to authorize a second group of users G2, called the delegatee group, (said group including the second user USR2) to access the machines PC that they use. This right of authorization is called a delegation. These delegation parameters Dlg therefore enable the delegations to be positioned at an administrator level.

Of course, it will be noted that a group G may only contain a single user.

In a non-limiting embodiment, the delegation parameters Dlg may be activated by a user USR from a group of users G1.

Therefore, the delegations may be activated by each user USR from the first group G1. Therefore, the access rights associated with the delegatee users, here the access right to the target machine PC1 by the second user USR2, have been activated by the first user USR1, the delegator. Activation of the delegation parameters is thus done at the user level.

In a non-limiting embodiment, execution parameters T are associated with access rights Rgt.

These execution parameters enable the access rights Rgt to be dedicated to a new user. In the non-limiting examples:

a first execution parameter T1 may be a delegation activation duration time. Therefore, in a non-limiting example, the first user USR1 may authorize the second user USR2 to access the target machine PC1 only during a given time. The activation is therefore temporary. In another example, the activation may be permanent.

a second execution parameter T2 may determine the actions authorized by the access rights Rgt. Therefore, for example, the second user USR2 may have access rights to the target machine PC1 but only to unlock/lock said target machine and to stop or modify a share operation, but he will not have rights to launch another share operation.

a third execution parameter T3 may determine the number of times that a user has the right to access a target machine. This prevents ill-timed access on the part of a user that has access rights to a machine.

It will be noted that these delegation parameters Dlg, their activation, and execution parameters T are saved in an access rights repository REF of the computer system SYS, as illustrated in FIG. 3. In a non-limiting example, the repository is a directory LDAP.

The security service SES1 has access to this repository REF and therefore verifies the access rights Rgt by verifying, on the one hand, the positioning of delegation parameters Dlg (performed by the administrator ADM) and, on the other hand, their activation.

Of course, the execution parameters T are verified at the same time. This double verification (delegation and activation parameters) enables the security service SES1 to be autonomous. There is no need for another testing machine so that the status change message MSG that ensues is sent.

It will be noted that security service SES1 is a background task that operates independently from a user session, i.e., even in the absence of a user session.

Therefore, the fact that the security service SES1 is autonomous from the session management user module M1 (that manages the user sessions) prevents said security service SES1 from stopping operation when said session management user module M1 is no longer active as is the case with some operating systems (not represented in the figures) such as, for example, Windows Vista™ on which said module M1 is based.

In addition, it will be noted that in general, the rights of a user on a machine are limited to a certain environment and therefore to certain actions.

As the security service SES1 is independent from the user session, the session management user interface UI1 does not have the same rights as said security service SES1 and therefore does not have access to the actions executed by the security service SES1. Therefore, this independence prevents a user from having access illicitly to the delegation parameters Dlg and from modifying in an ill-timed manner the positioning of its access rights Rgt, for example.

In a third step 3), if so (when the second user USR2 has access rights to the target machine PC1), said security service SES1 sends a status change message MSG to the session management module M1 of said target machine PC1.

Of course, if not (step 3') (when the second user USR2 does not have any access right to the target machine PC1), said security service SES1 sends an error message MSG_NOK to warn the user that he does not have rights to lock/unlock the target machine PC1.

It will be noted that a status change message MSG is an application-oriented message that is defined according to the session management module M1 of the target machine PC1 and more specifically according to the session management user interface UI1. The same is true for an error message MSG_NOK.

Therefore, for example, in the case of a Windows™ session management user interface, a status change message is a notification managed by Windows. In another example, in the case of a Linux™ session management user interface, a status change message is an event managed by Linux™.

It will be noted in addition that in the case where the session management user module M1 is no longer active (as explained above depending on the operating systems), the receipt of an application-oriented message MSG, MSG_NOK awakens it and it becomes active again.

In a first non-limiting embodiment, the status change message MSG is directly sent to the session management user interface UI1 of the session management module M1, as illustrated in FIG. 4 by an arrow in a solid line (step TX(MSG) or TX(MSG_NOK)). Upon receipt of this message MSG, said interface UI1 calls a low-level unlocking function FCTd (sul) of the operating system (not represented) of said target machine PC1.

In a second non-limiting embodiment, the status change message MSG is sent to a plugin PLGN1 of the session management module M1, as illustrated in FIG. 4 by an arrow in the form of dashes (step TX(MSG) or TX(MSG_NOK)). Plugin PLGN1 then solicits the session management user interface UI1 of the session management module M1. Upon this solicitation, the interface UI1 calls a low-level unlocking function FCTd(sul) of the operating system (not represented) of said target machine PC1.

The use of a plugin PLGN1 avoids modifying the existing session management user interface in a machine to integrate a status change message receipt function MSG or replace it by a new session management user interface integrating the status change message receipt function MSG, as is the case in the first embodiment above.

In a non-limiting example, this unlocking function FCTd (sul) is found in a dynamic link library. Depending on the type of operating system, this library will have a different extension (for example .dll for "dynamic link library;" .so for "shared object;" .dylib for "dynamic library;" .a for "archive;" .sl for "shared library;" .sa for "archive.") As such libraries are known to the person skilled in the art, they are not described in further detail here. In another non-limiting example, this unlocking function FCTd(sul) is a binary function. In this case, contrary to dynamic link libraries, the session management user module M1 requires recompilation.

In a fourth step 4), said session management module M1 proceeds to said status change slo/sul (when step 3 has been carried out).

In particular, this status change is performed by the session management user interface UI1 with the low level function FCTd(sul), as explained above.

Therefore, in the example taken, after changing the status, the target machine PC1 is unlocked (unlocked status sul).

Therefore, the second user USR2 could access the target machine PC1 without needing the "login" (user identifier plus password) of the first user USR1. Thanks to his access rights Rgt to target machine PC1, he could unlock the user session that was opened and then locked by the first user USR1. The second user USR2 could take over on this session.

The second user USR2 may subsequently move to the location of this target machine PC1 and perform any action necessary on said target machine PC1 (via the keyboard, mouse or screen of said target machine, for example), and particularly stop a share operation in the context of the application described.

It will be noted that following this unlocking and this intervention on a share operation launched from target machine PC1, the second user USR2 may then return to his place and, if he has not locked the session on PC1, lock from his source machine PC2 this user session on target machine PC1 (opened by the first user USR1) that he unlocked. Then a low level locking function FCTv(slo) is called.

In a fifth step 5), traceability information H, D, IDU, GUI corresponding to said query RQ is recorded in a query management base BDRQ.

In a non-limiting embodiment, the recording is performed by the security service SES1 of the target machine PC1.

It will be noted that this fifth step may be carried out at any time from the query receipt step (either in parallel or after).

It will be noted that the query management base BDRQ is managed by the computer system SYS administrator ADM.

In non-limiting examples, this traceability information may comprise:
the author IDU of the query RQ;
identification data GUI of the target machine (name, IP address, unique identifier commonly called "Global Unique Identifier")
time information comprising:
the date D on which the query was launched; and
the time H on which the query was launched. The time information is also called a timestamp.

Therefore, this traceability information enables the administrator ADM to have a log of queries RQ launched on a given machine and particularly enables the real user to be known who was responsible for said machine at a given time and therefore who launched such an action on said machine on such a date and at such a time.

Therefore, the status change method enables passage from a locked status to an unlocked status or vice versa by a remote query RQ. It offers a remote client-server unlocking/locking functionality, the client being the source machine PC2 that invokes the security service SES1 of the target machine PC1.

It enables a user session to be taken over by a user different from that who opened said session.

The status change method is implemented by a target machine PC1 comprising a security service SES1 and a session management module M1.

Figure 5:
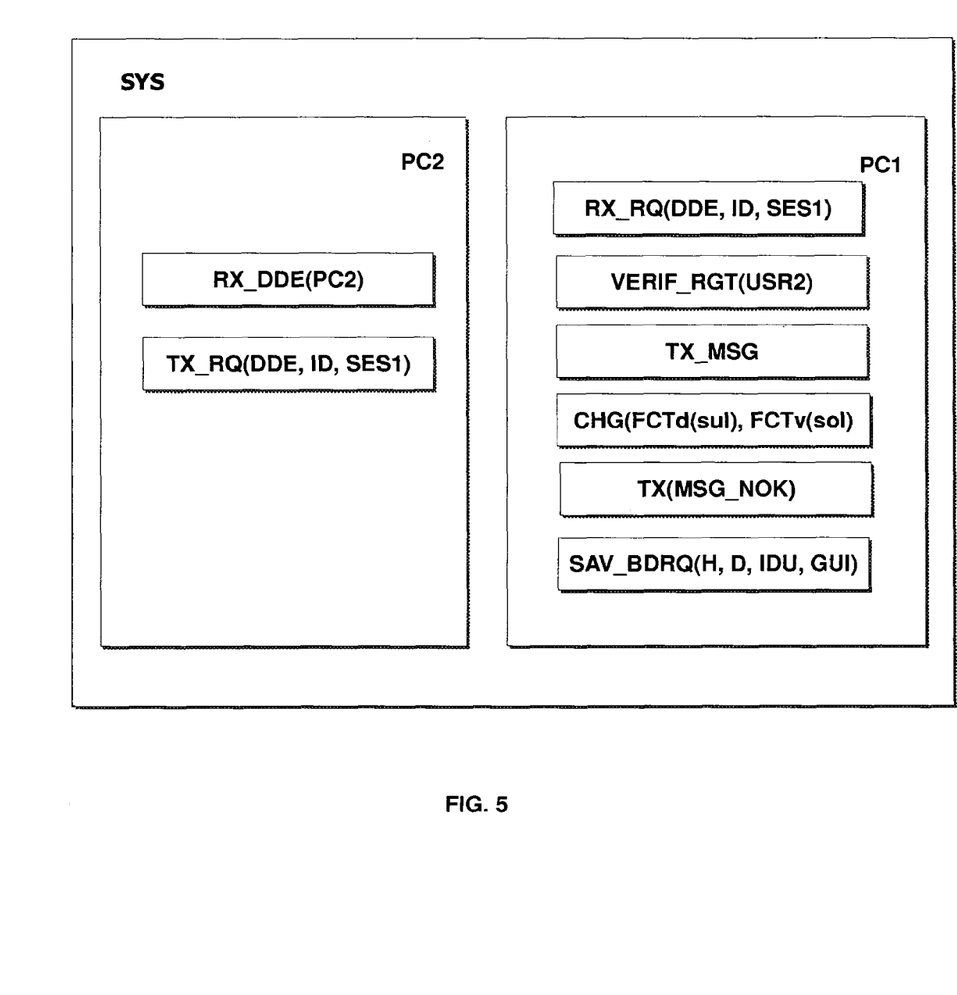
FIG. 5 is a second schematic representation of a computer system comprising a target machine and a source machine, said target machine being capable of implementing the status change method from FIGS. 1 and 2.

A computer system SYS capable of changing the status, locked slo or unlocked sul, of a target machine PC1 according to a first non-limiting embodiment is illustrated in FIG. 3 and FIG. 5. It comprises said target machine PC1 and a source machine PC2 capable of cooperating with said target machine PC1.

Said target machine PC1 is capable of:
receiving, by said security service SES1 a query RQ corresponding to a request DDE to change the status of the target machine PC1, said query RQ comprising at least one piece of identification information ID from a user USR2 of a source machine PC2;
from said security service SES1, verifying if access rights Rgt associated with said source machine PC2 user USR2 allow a change in its status by said user USR2;
if so, sending, from said security service SES1, a status change message MSG to the session management module M1 and proceeding to said status slo/sul change by said
Session management module M1.

In a non-limiting embodiment, the session management module M1 (also called target session management module) comprises:
a plugin PLGN1 (also called target plugin) capable of receiving a status change message MSG from said security service SES1; And—a session management user interface UI1 capable of being solicited by said plugin to change the status of said target machine PC1.

Said source machine PC2 is capable of cooperating with said target machine PC1 comprising a security service SES1, said source machine PC2 being capable of:
receiving a request DDE to change the status of the target machine PC1 by a user USR2 of the source machine PC2; and
sending a query RQ corresponding to said request DDE to the security service SES1 of said target machine PC1, said query RQ comprising at least one piece of identification information ID from a user USR2 of said source machine PC2.

Of course, the description is not limited to the application, modes of embodiment or examples described above.

Therefore, the same explanations described above for the non-limiting example of a target machine PC1 found in a locked slo status previously by the first user USR1 apply in the case of a target machine PC1 found in an unlocked sul status previously by the first user USR1. In this case, a low level locking FCTv(sol) function will be called to lock said target machine PC1.

Therefore, in a non-limiting embodiment, delegations may be activated by the administrator ADM instead of a user from an authorized group.

Therefore, in a first non-limiting embodiment, the source machine PC2 also comprises a security service SES2, called source security service (instead of a dedicated program such as the unlocking/locking module MOD2) that is capable of:
receiving a request DDE to change the status of the target machine PC1 from the second user USR2;
sending a query RQ corresponding to said request DDE to the security service SES1 of said target machine PC1, said query RQ comprising at least one piece of identification information ID from the second user USR2 of said source machine PC2.

This avoids modifying the session management user interface UI2 of the source machine PC2 to integrate these two functions (receipt of the request DDE and sending of a corresponding query RQ).

Therefore, in a second non-limiting embodiment, a plugin PLGN2 (called source plugin) is associated with the session management user interface UI2 of the source machine PC2 (instead of a dedicated program such as the unlocking/locking module MOD2), said plugin PLGN2 being capable of receiving:
A request DDE to change the status of the target machine PC1 from the second user USR2;
sending a query RQ corresponding to said request DDE to the security service SES1 of said target machine PC1, said query RQ comprising at least one piece of identification information ID from the second user USR2 of said source machine PC2.

This avoids modifying the session management user interface UI2 of the source machine PC2 to integrate these two functions (receipt of the request DDE and sending of a corresponding query RQ).

Figure 6:
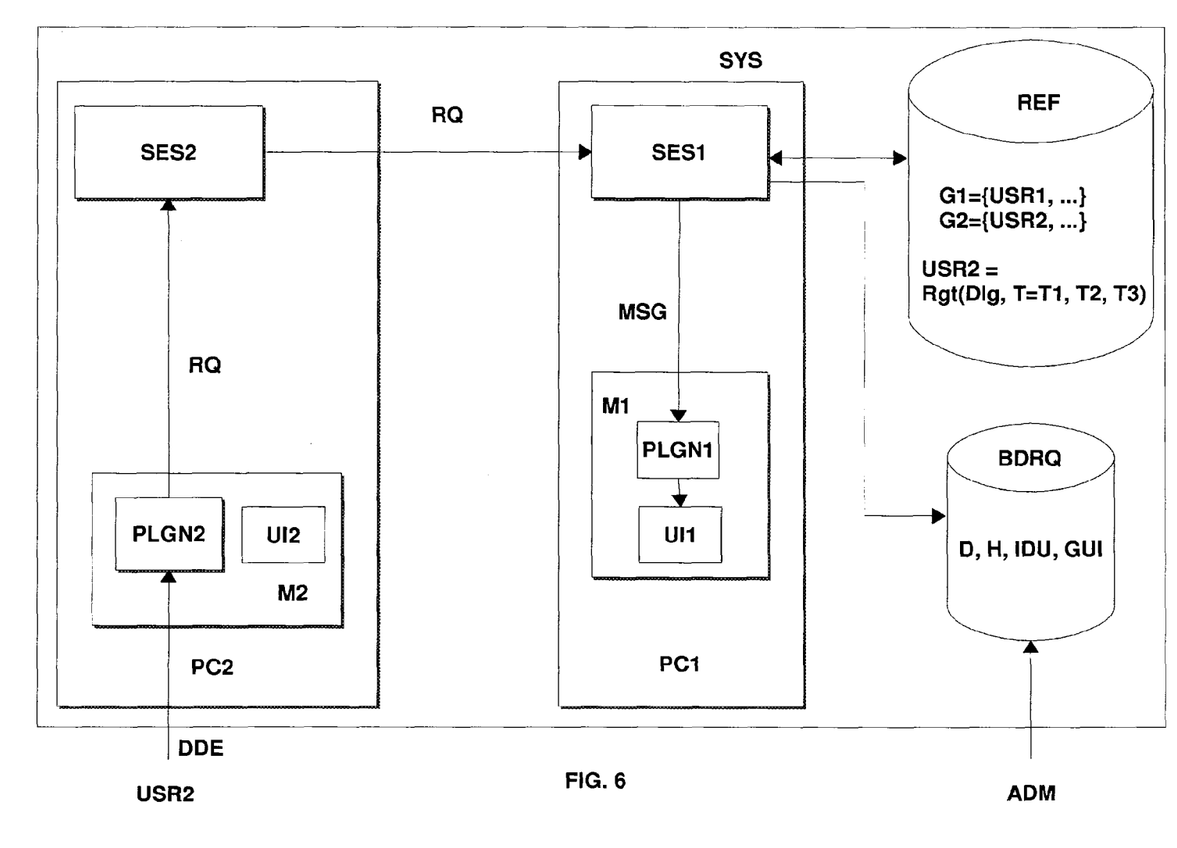
FIG. 6 is a third schematic representation of a computer system comprising a target machine and a source machine, according to a second non-limiting embodiment, said target machine being capable of implementing the status change method from FIGS. 1 and 2.

Of course, the two embodiments (security service SES2 and PLGN2) may be intercombined such as illustrated in FIG. 6. In this case, the source plugin PLGN2 is capable of performing the first request DDE receipt function, while the source security service SES2 is capable of performing the corresponding second query RQ sending function. The source plugin PLGN2 and the source security service SES2 form a source session management user module M2.

Therefore, in a non-limiting embodiment, the sending of a query RQ may be done by a communication protocol other than TCP/IP or UDP. Any communication protocol that enables an exchange of data over a computer network between several machines may be utilized.

Therefore, in a non-limiting embodiment, during activation of access rights Rgt by the first user URS1 authorizing the second user USR2 to access the target machine PC1, an application-oriented acceptance message may be sent to the source machine PC2 so that the second user USR2 accepts said delegation. This message is, for example, a dialog box commonly called a "pop-up."

Therefore, in a non-limiting embodiment, one may restrict the delegation authorization associated with the second user USR2 to a sub-set of machines of the first user URS1.

Therefore, the method described may be used in applications other than that described for the banking domain. For example, it may be applied in the context of monitoring:
a nuclear power plant,
a telephone network,
a rail network,
within a control tower,
within a bank of elevators, etc.

And generally any application necessitating particular monitoring on a screen of a target machine that may necessitate rapid intervention on the part of an operator on a target machine that is not the machine that he uses.

Thus, the invention described presents, in particular, the following advantages:
the invention is easy to implement;
it enables the status of a machine to be remotely changed by a user who is not the user of said machine;

it is secured due to the target security service SES1 that is found outside the target session management user module M1 and that is therefore independent from the latter;

It enables a target machine to be accessed by taking over the user session already existing on said target machine by a person who is not the user of the target machine and therefore who is different from the user who had locked/unlocked the previous user session. Therefore, a same user session may be opened and locked by a user, but unlocked by a different person (or vice versa, unlocked by a user, but locked by a different non-user person);

it enables queries to be audited, particularly those relating to actions launched on a machine thanks to the query log, and therefore enables the real author of actions performed on a machine to be identified;

it enables having two access levels (a first administrator level with positioning of delegations, a second user level with activation of said delegations) to define the access rights to a target machine associated with a person who is not the user of said target machine. Therefore, this enables a double control of said access rights and therefore a high level of control;

it enables access rights that are parameterable thanks to the execution parameters and therefore enables some of these access rights to be singled out if necessary;

it avoids giving a login to a user who is not the proprietor of said login to unlock/lock the machine of the login proprietor, which maintains the confidentiality of said login; And it enables a user session on a target machine to be unlocked by maintaining the identity of the user (the first user USR1 in the example taken) at the origin of the session (i.e., who opened it) without no longer using the login of another person who not a user of said target machine (the second user URS2 in the example taken).

The invention claimed is:

1. A method to change the status, locked or unlocked, of a target machine comprising a security service and a session management module, the method comprising:
   receiving, by said security service a query corresponding to a request to change the status of the target machine, said query comprising a piece of identification information from a user of a source machine;
   from said security service, verifying if access rights to said target machine associated with said user of the source machine allow a change in the status of the target machine by said user;
   if the change of status is allowed, sending, from said security service, a status change message to the session management module of said target machine and proceeding to said status change by said session management module,
   wherein the verifying includes accessing by said security service an access right repository that is separate from said target machine, and
   wherein the access right repository includes a delegation parameter that stipulates that a user of the target machine has the right to authorize another user to access the target machine.

2. The status change method according to claim 1, comprising recording, in a query management base, traceability information corresponding to said query.

3. The status change method according to claim 1, wherein the access rights depend on delegation parameters from one group of users to another group of users.

4. The status change method according to claim 3, wherein the delegation parameters can be activated by a user from a group of users.

5. The status change method according to claim 1, wherein execution parameters are associated with the access rights.

6. The status change method according to claim 1, wherein the query to change the status is a TCP/IP or UDP query.

7. The status change method according to claim 1, wherein the status change message is an application-oriented message defined according to the session management module of the target machine.

8. The status change method according to claim 1, wherein the status change message is sent to a plugin of the session management module.

9. The status change method according to claim 1, wherein, when the security service accesses the access right repository, the security service verifies a positioning of the delegation parameter and whether the delegation parameter is activated.

10. A target machine comprising a security service and a session management module, said target machine configured to:
    receive by said security service a query corresponding to a request to change the status, locked or unlocked, of the target machine, said query comprising a piece of identification information from a user of a source machine;
    from said security service, verify if access rights associated with said source machine user allow a change in the status by said user;
    if the change is allowed, send, from said security service, a status change message to the session management module and proceed to said status change by said session management module,
    wherein, to verify if access rights associated with said source machine user allow a change in the status by said user, said security service is configured to access an access right repository that is separate from said target machine, and
    wherein the access right repository includes a delegation parameter that stipulates that a user of the target machine has the right to authorize another user to access the target machine.

11. The target machine according to claim 10, wherein the session management module comprises:
    a plugin configured to receive a status change message from said security service; and
    a session management user interface configured to be solicited by said plugin to change the status of said target machine.

12. A source machine configured to cooperate with a target machine, said target machine comprising a security service and a session management module, said source machine configured to:
    receive a request to change the status, locked or unlocked, of the target machine by a user of the source machine; and
    send a query corresponding to said request to the security service of said target machine so that, based on said query, said security service (a) verifies if access rights associated with said source machine user allow a change in the status by said user and if the change is allowed, (b) sends a status change message to the session management module and proceed to said status change by said session management module,
    said query comprising a piece of identification information from a user of said source machine,
    wherein, to verify if access rights associated with said source machine user allow a change in the status by said user, said security service is configured to access an access right repository that is separate from said target machine, and wherein the access right repository includes a delegation parameter that stipulates that a user of the target machine has the right to authorize another user to access the target machine.

13. A computer system configured to perform a change of status, locked or unlocked, of a target machine, said computer system comprising a target machine and a source machine configured to cooperate with said target machine, the target machine comprising a security service and a session management module, said target machine configured to:

receive by said security service a query corresponding to a request to change the status, locked or unlocked, of the target machine, said query comprising a piece of identification information from a user of the source machine;

from said security service, verify if access rights associated with said source machine user allow a change in a status thereof by said user;

if the change is allowed, send, from said security service, a status change message to the session management module and proceed to said status change by said session management module, wherein, to verify if access rights associated with said source machine user allow a change in the status by said user, said security service is configured to access an access right repository that is separate from said target machine, and wherein the access right repository includes a delegation parameter that stipulates that a user of the target machine has the right to authorize another user to access the target machine.

* * * * *